United States Patent

[11] 3,554,559

| [72] | Inventor | John Charles Dahlheimer |
| | | Laconia, N.H. |
| [21] | Appl. No. | 770,758 |
| [22] | Filed | Oct. 25, 1968 |
| [45] | Patented | Jan. 12, 1971 |
| [73] | Assignee | International Packings Corporation |
| | | Bristol, N.H. |
| | | a corporation of New Hampshire |

[54] SEAL
1 Claim, 4 Drawing Figs.
[52] U.S. Cl.................................................. 277/37,
 277/41, 277/85
[51] Int. Cl..................................................... F16k 41/00,
 F16j 9/00
[50] Field of Search........................................... 277/37, 36,
 41, 42, 43, 89, 86, 85

[56] References Cited
UNITED STATES PATENTS

| 2,447,663 | 8/1948 | Payne............................ | 277/86 |
| 2,806,720 | 9/1957 | Meyer............................ | 277/37 |
| 2,879,093 | 3/1959 | Dolhun........................... | 277/41 |

Primary Examiner—Samuel B. Rothberg
Attorney—Martin Kirkpatrick

ABSTRACT: A unitized face seal for fluid sealing between a rotatable shaft and a radially disposed housing surface through which the shaft extends. Axially directed sealing surfaces are biased into sealing contact by a spring isolated from the fluid sealed by a flexible bellows. Internal components of the seal are enclosed and protected from contaminants prior to seal installation and from abrasive impingement during seal operation by an annular shroud integral with the rotating portion of the seal.

PATENTED JAN 12 1971
3,554,559
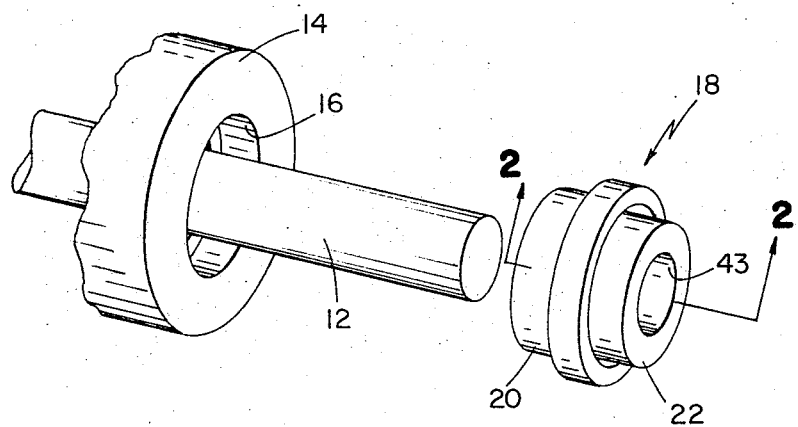
FIG 1
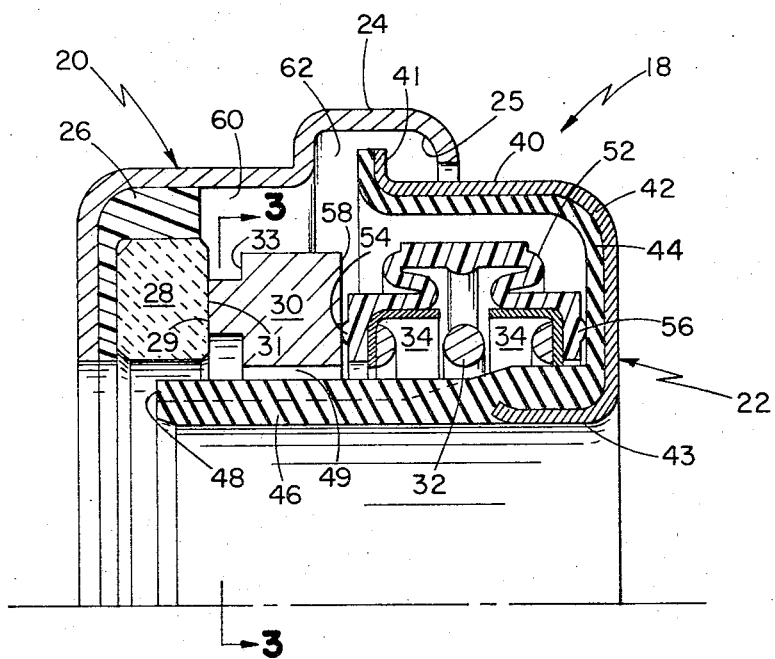
FIG 2
FIG 3

SEAL

This invention relates to a unitized face seal for fluid sealing between a rotatable shaft and a radially disposed housing surface through which the shaft extends.

It is a primary object of the invention to provide effective fluid sealing throughout an extended operating life even when the fluid sealed contains abrasive particles which may flow past the seal at relatively high velocity; the seal configuration protects the sealing surfaces from abrasive impingement and isolates certain vital metal components of the seal from fluid contact and consequent corrosion hazards.

Other objects of the invention are to provide a unitized single-assembly seal in which the critical sealing faces and internal moving parts are protected against damage and accidental introduction of contaminants prior to installation, which can be pretested as a unit prior to installation, which can be rapidly installed in one simple operation, which continues to function effectively even after considerable wear of the sealing faces, and which can be economically manufactured with seal washers of wide dimensional tolerance.

The invention features a stationary assembly and a rotating assembly. The stationary assembly includes a case mountable within a cylindrical bore in the housing surface and containing an annular seal seat with a radially disposed sealing surface. The rotating assembly includes a seal washer axially biased into sealing engagement with the seal seat by a spring, a flexible fluid-tight bellows of variable axial length between the spring and the fluid being sealed, and an annular shroud sealingly engaging the rotating shaft and defining in conjunction with the stationary case the outer wall of a fluid manifold adjacent the sealing faces.

Other objects, features, and advantages will appear from the following description of a preferred embodiment of the invention taken together with the attached drawings thereof in which:

FIG. 1 is a perspective view showing the entire seal in position for installation;

FIG. 2 is a sectional view taken on line 2–2 of FIG. 1;

FIG. 3 is a sectional view taken on line 3–3 of FIG. 2; and

Figure 4:
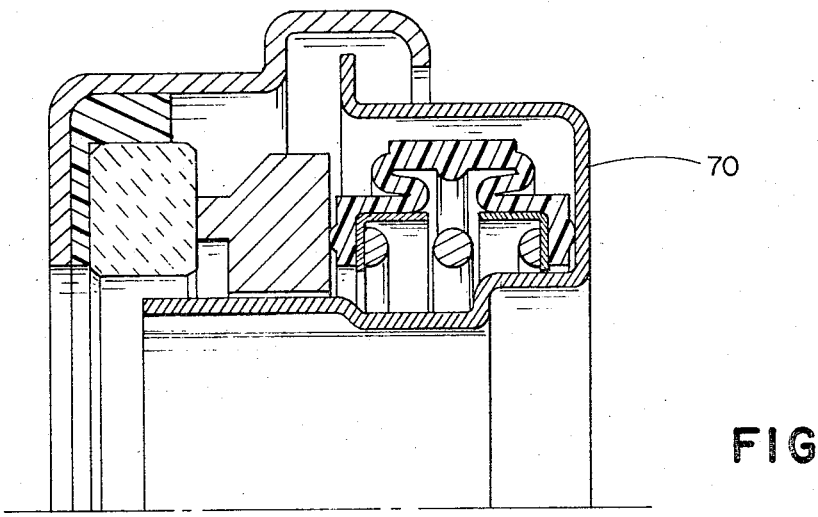
FIG. 4 is a sectional view of an alternate embodiment taken in the same direction as that of FIG. 2.

Referring more particularly to the drawings, in FIG. 1 a rotatable shaft 12 is shown extending through a housing surface 14 having a seal retaining bore 16. The seal, generally designated 18, which is composed of a stationary assembly 20 and a rotating assembly 22, is intended to keep fluid on the outer (seal) side of the housing surface 14 from penetrating the housing at the point where the rotating shaft passes through the housing. Stationary assembly 20 is sized for a fluid-tight interference fit in seal-receiving bore 16. The rotating assembly 22 is press fitted to shaft 12, the joint being also fluid-tight. The working elements of the seal are designed to provide an efficient dynamic seal between stationary assembly 20 and rotating assembly 22, permitting free relative rotation while preventing fluid passage across the moving interface.

A quarter-sectional view taken on line 2–2 of FIG. 1 is shown in FIG. 2. The stationary assembly 20 includes a metallic annular case 24, an elastomeric gasket 26, and a seal seat 28 formed of sintered alumina ceramic. Metallic case 24 is made of brass for corrosion resistance and ease of fabrication. The gasket 26 is held in position by compression alone and need not be bonded to case 24. Seal seat 28 is chemically inert and has excellent bearing characteristics (at axially-outward directed sealing face 29), great hardness, and a high modulus of elasticity.

The rotating assembly 22 includes a seal washer 30 axially biased into sealing contact (at axially-inward directed sealing face 31) with seal seat 28 by spring 32 and housed within annular labyrinth shroud 40. The seal washer may be fabricated economically from a phenolic plastic, but a more durable and effective seal can be obtained, although at somewhat increased cost, if the seal washer is made of molded and sintered carbon graphite. Because carbon graphite has poor dimensional stability during the sintering process, a diametral variation between individual seal washers of about 1.5 percent to 2 percent is to be expected. This diametral variation does not affect the seal design of this invention since no other components of the rotating assembly 22 need be used in a diametral press-fit relationship with the seal washer 30 for purposes of making the seal leakproof or for purposes of unitizing the rotating assembly. Locating the annular sealing face 31 of the rotating seal washer well within the diametral limits of the larger annular sealing face 29 of the seal seat allows for diametral variations in the rotating seal washer as well as allowing the seal washer to determine its tracking path on the seal seat without regard to normal offset conditions of the center line of shaft 12 with respect to the center line of seal retaining bore 16. Sealing face 29 of seal seat 28 extends radially appreciably inward and outward of sealing face 31 of seal washer 30.

The L-shaped metal ferrules 34 provide a full 360° of axially imparted force to the seal washer 30 regardless of normal variations in the end coils of the spring. Both ferrules and spring are protected from corrosive and errosive action of the fluid being sealed by the elastic bellows 52. (The fluid sealed fills manifold 60, entering between case 24 and shroud 40). The bellows flex-pivots at four bends, thus permitting variation in axial length with minimum stress. This feature, coupled with the spring bias of sealing face 31, permits the seal to continue to function effectively even after extensive wear of the sealing faces.

Sealing beads 54 and 56 promote a fluid-tight seal between the bellows 52 and the seal washer 30 and shroud 40 by reducing contact area and thus increasing the contact pressure produced by spring 32. Bead 54 serves the additional function of concentrating the spring force transmitted to seal washer 30 at a mean diameter relatively close to the mean diameter of sealing face 31, and so minimizing shear force induced distortion of "coning" of the seal washer.

The seal washer 30 is designed to be hydraulically balanced with respect to axially directed fluid forces; that is, the pressure of the fluid in manifold 60 is restricted by sealing bead 54 to an axially-inward directed annular surface 58 at the outer side of seal washer 30 having an area approximately equal to the area of sealing face 31 plus the area of axially-outward directed surface 33 at the inner side of seal washer 30. This prevents the creation of any outwardly directed hydraulic force differential between the front and the back of the seal washer (such a force differential would be undesirable in that it could significantly subtract from the engineered mechanical force of spring 32 tending to bias together the sealing faces 31 and 29). In the event that sealing contact is broken by the formation of steam or by other transient pressure increments at the sealing interface, the opposed (inwardly-directed) fluid pressure upon surface 58 acts in conjunction with the spring bias to accelerate the restoration of sealing contact between sealing faces 31 and 29. The relatively large area of fluid contact with sealing washer 30 and sealing seat 28 provides good heat dissipation and thus counteracts overheating of the sealing surfaces.

Annular labyrinth shroud 40 is composed of an outer shell 42 of metal, for example stainless steel, bonded to an inner elastomeric lining 44. Preferably, lining 44 is integrally formed within the shell 42. The inside of the shell 42 is first coated with a suitable bonding agent, and then a plug of uncured elastomer is placed within the shell and subjected to heat and pressure sufficient to ensure that the elastomer is simultaneously cured, molded to its final shape, and bonded to the shell. The radially innermost surface 43 of shell 42 is sized for a press fit to shaft 12.

Lining 44 is formed with a shroud neck 46 extending axially inward along the shaft 12 (in the direction of housing surface 14) to a point beyond the sealing interface. Shroud neck 46 is sized for a tension fit upon shaft 12, and is thus forced into any irregularities such as longitudinal scratches on the shaft surface to ensure a leakproof installation. Because shroud neck 46 is formed of a nonconductive elastomer, it has no galvanic affinity for the fluids being sealed. For this reason, if a light fluid leakage or weepage past the sealing faces 29 and 31 should occur, a deposit or buildup of the leakage residue will not take place as would be the case if the neck of the shroud were made of metal or if the metal shaft were exposed in the immediate vicinity of the seal interface.

Semicylindrical drive lugs 48 on shroud neck 46 engage cooperating groove s49 in seal washer 30 (as best seen in FIG. 3) causing the seal washer to rotate with the shaft 12. The drive lugs 48 are rigid enough to transmit driving force from the shaft 12 to the rotating seal washer 30, yet are flexible enough to absorb any shock that may be caused by frictional breakout torque at the sealing faces.

In FIG. 2, the case 24 and the annular labyrinth shroud 40 are shown in the relative positions they would normally occupy after the seal is installed. The area shown in the FIG. to the right of housing surface 14 would typically contain the fluid to be sealed; the fluid would also enter and fill manifold 60. For many applications, the fluid may have abrasive particles entrained and may, outside the case and shroud, be moving with appreciable velocity. The restricted convoluted passage 62 between fixed case 24 and the rotating labyrinth shroud 40 prevents abrasive impingement upon the sealing interface, and consequently can greatly extend the useful life of the seal.

Prior to seal installation, the axial bias of spring 32 tends to separate stationary assembly 20 and rotating assembly 22. This spring bias causes shroud 40 to move axially outward from the sealing interface until flange 41 of shroud 40 bears against flange 25 of case 24, preventing further relative axial motion, closing passage 62, and locking the seal into a single unitized assembly. Until the seal is installed around shaft 12, passage 62 remains closed, preventing the accidental introduction of contaminants into manifold 60. Furthermore, the critical sealing faces 29 and 31 are held in contact with each other and thus (as opposed to the case of seals in which the two relatively movable components are separate prior to installation) the sealing faces are protected against chipping, scratches, and contaminants such as dust and fingerprints during shipping, storage, handling, and installation. Furthermore, the unitized structure permits thorough performance testing of the assembled seal at the time of manufacture.

Installation is readily performed in a single simple operation. The seal case is placed in the bore of an annular mounting fixture and the entire seal is then pressed onto the shaft 12 and pressed into bore 16 of the housing surface 14 with a fluid-tight interference fit.

The preferred embodiment described above is designed to seal outside fluid from entering the housing through which the shaft 12 emerges. For certain, less common, applications it may be desired instead to seal fluid inside the housing. The tendency of the fluid to move centrifugally outward from the rotating shaft makes the latter form of sealing less efficient and more subject to leakage than the former. Nevertheless, the design of the present invention can, if required, be modified to permit such inside sealing. Primarily, the modification required consists of inverting the relative positions of the bellows 52 and the spring and ferrules. The bellows is turned radially inward rather than outward, and the spring and ferrules are installed radially outward of the bellows (the seal washer cross section may also be modified as required to preserve the proper hydraulic balance and bias force). Spring and ferrules are open to manifold 60, but are separated from shroud neck 46 by the bellows.

Variations in the materials of the seal may of course be made while yet remaining within the scope of the invention claimed. One such modification which, under certain circumstances, has proved useful, is to fabricate the shroud 40 as an integral molding of glass-filled hydrolysis-resistant nylon. Another modification which, under certain circumstances has proven useful, is to provide a labyrinth shroud consisting only of a metal shell of a modified design similar to that depicted at 70 in FIG. 4, omitting any bonded elastomeric inner lining as described in the preferred embodiment.

Other embodiments will occur to those skilled in the art and are within the following claims.

I claim:

1. A face seal for fluid sealing between a rotatable shaft and a radially disposed housing through which the shaft extends comprising:

a stationary assembly sized for fluid-tight engagement to a cooperating bore in said housing surface;

a rotating assembly securable to said shaft;

said stationary assembly comprising:

an annular case having an outer wall extending axially outward from said housing surface and radially spaced from said shaft, said outer wall including a radially outwardly extending annular channel;

an annular seal seat mounted within said case adjacent the inner end thereof and having a first annular seal face directed axially outward;

said rotating assembly comprising:

an annular shroud extending axially inward and radially spaced from said shaft and having a radially-outwardly extending flange sized and positioned to fit without contact within said channel when said seal is installed upon said shaft, said shroud having an annular neck sized for fluid-tight engagement with said shaft and extending axially inward from the outer axial extremity of said shroud to a point axially inward of said first seal face;

a seal washer axially movable with respect to said neck but rotatably fixed with respect to said neck and having a second annular seal face directed axially inward and biased into sealing contact with said first seal face by a spring between said shroud and said seal washer; and a fluid-tight bellows positioned to protect said spring from contact with the fluid sealed, said case and said shroud together defining an annular manifold surrounding said shaft and, after said seal is installed upon said shaft, open to the region outside said housing surface only through a labyrinthine passage between said channel and said flange, said spring, before said seal is installed, biasing said flange against the axially outer surface of said channel and thereby closing said passage and holding said stationary assembly and said rotating assembly interlocked as a single unit.